US009775773B2

(12) United States Patent
Duncan

(10) Patent No.: US 9,775,773 B2
(45) Date of Patent: Oct. 3, 2017

(54) ROTATING CONTROL PANEL

(71) Applicant: Sauna Works Inc., Berkeley, CA (US)

(72) Inventor: Raleigh Duncan, Berkeley, CA (US)

(73) Assignee: SAUNA WORKS INC., Berkeley, CA (US)

( * ) Notice: Subject to any disclaimer, the term of this patent is extended or adjusted under 35 U.S.C. 154(b) by 711 days.

(21) Appl. No.: 13/736,947

(22) Filed: Jan. 9, 2013

(65) Prior Publication Data

US 2014/0191048 A1 Jul. 10, 2014

(51) Int. Cl.

*G05D 23/00* (2006.01)
*G05D 1/00* (2006.01)
*E04B 1/346* (2006.01)
*A61H 33/06* (2006.01)
*A61H 33/00* (2006.01)

(52) U.S. Cl.

CPC ......... *A61H 33/066* (2013.01); *A61H 33/005* (2013.01); *A61H 2033/0058* (2013.01)

(58) Field of Classification Search

CPC .......... A61H 33/066; A61H 2033/0058; A61H 33/005
USPC ..................................... 236/94; 701/1; 52/64
See application file for complete search history.

(56) References Cited

U.S. PATENT DOCUMENTS

| | | | | |
|---|---|---|---|---|
| 3,092,258 | A * | 6/1963 | Bleed | A47F 5/02 211/163 |
| 3,586,290 | A * | 6/1971 | Null | F16K 1/2285 251/306 |
| 3,647,180 | A * | 3/1972 | Church | F16K 1/2263 251/306 |
| 3,797,829 | A * | 3/1974 | Heller | A63F 3/00261 273/271 |
| D261,711 | S * | 11/1981 | Mulvihill | D6/680.2 |
| 4,890,845 | A * | 1/1990 | Gatewood | A63F 3/00094 273/143 E |
| 5,161,321 | A * | 11/1992 | Kuhnke | 40/493 |
| D390,482 | S * | 2/1998 | Pasquarette | D10/50 |
| D520,884 | S * | 5/2006 | Simon et al. | D10/50 |
| D558,073 | S * | 12/2007 | Simon et al. | D10/50 |
| D725,524 | S * | 3/2015 | Takach et al. | D10/103 |
| D734,179 | S * | 7/2015 | Golden | D10/50 |
| 2003/0202003 | A1* | 10/2003 | Marmaropoulos | 345/710 |
| 2004/0027793 | A1* | 2/2004 | Haraguchi et al. | 361/683 |
| 2004/0103593 | A1* | 6/2004 | Beasley | A47B 49/00 52/64 |
| 2004/0114316 | A1* | 6/2004 | Carter et al. | 361/681 |
| 2004/0141284 | A1* | 7/2004 | Chen et al. | 361/681 |
| 2004/0160733 | A1* | 8/2004 | Hsu | 361/681 |
| 2004/0192220 | A1* | 9/2004 | Huang et al. | 455/74 |
| 2005/0041171 | A1* | 2/2005 | Shin | 349/58 |
| 2006/0006244 | A1* | 1/2006 | Morrow et al. | 236/1 C |
| 2006/0238637 | A1* | 10/2006 | Goto et al. | 348/333.06 |
| 2007/0104467 | A1* | 5/2007 | Wang et al. | 386/125 |
| 2007/0228183 | A1* | 10/2007 | Kennedy et al. | 236/1 C |
| 2011/0016739 | A1* | 1/2011 | Beck et al. | 34/275 |

* cited by examiner

*Primary Examiner* — Henry Crenshaw

(74) *Attorney, Agent, or Firm* — Kwan & Olynick LLP

(57) ABSTRACT

A control panel for an enclosed space, set into a cutout in the wall of the enclosed space, that can rotate at least 180 degrees so as to be accessible from either the inside or the outside of the enclosed space.

12 Claims, 5 Drawing Sheets

ROTATING CONTROL PANEL

CROSS-REFERENCE TO RELATED APPLICATIONS

The present application claims the benefit of U.S. Provisional Application No. 61/585,409, filed Jan. 11, 2012, which is incorporated herein by reference in its entirety.

BACKGROUND

Field of the Invention

The present invention relates to control panels, specifically to control panels used to control the environmental factors of an enclosed space.

Background of the Invention

There are many situations in which a control panel would need to be accessible from both inside and outside an enclosed space. One such situation may arise in enclosed spaces where the temperature, humidity, or other environmental parameters are under strict control, such as cleanrooms, art preservation enclosures, high-oxygen enclosures for medical use, steamrooms, or saunas. In such situations, a user may not want to have to enter the enclosed space in order to access the controls on the inside, or, once inside, to have to exit the enclosed space in order to access the controls on the outside. While it is possible to design such an enclosed space to have two sets of controls, one on the inside and one on the outside, it is expensive and unnecessarily duplicative.

This problem is especially applicable to saunas, since once a user is relaxing inside a sauna, he or she may not want to have to exit the sauna in order to change the temperature; on the other hand, if a user wants to set the temperature in a sauna ahead of time, he or she may not want to enter the sauna wearing shoes and regular street clothes.

It may also be unsafe to have a sauna where the temperature is only controllable from the outside. If the door to the sauna gets stuck or jammed, and the user is unable to exit the sauna, he or she has no way to turn off the heating unit.

One solution to the problem, as it pertains to saunas, is described in U.S. Pat. No. 4,384,190 to Janson. Janson discloses a control panel arrangement for a sauna heating unit that can be operated from either inside or outside the sauna; it comprises a temperature control knob and an on-off switch on the outside of the sauna that are connected to shafts going through a special air channel into the inside of the sauna, enabling the user to control the temperature knob or the on-off switch from inside the sauna as well. While this invention solves the problem, it is complex and cumbersome.

Modern touchscreen panels are much easier and more convenient to use than control knobs, and some sauna designs do incorporate touchscreen control panels. However, most such saunas only offer one touchscreen control panel on the outside of the sauna, or two touchscreens, one on the inside and one on the outside. The first is unsafe and inconvenient for the user, and the second is expensive and unnecessarily complex.

A need therefore exists for a way to control an enclosed space with one control panel that can be accessed from either inside or outside the space.

SUMMARY OF THE INVENTION

The present invention allows a user to control the parameters of an enclosed space from either the inside or the outside. The control panel is positioned within a cutout in the wall of the enclosed space, and mounted on a rotating mount. The user can then rotate the control panel to face either the inside or the outside of the enclosed space.

While in the preferred embodiment, the enclosed space is a sauna, the invention is applicable to other enclosed spaces such as cleanrooms, high-oxygen chambers for medical use, climate controlled art preservation spaces, and similar spaces where some environmental parameters are strictly controlled.

The rotating mount may comprise a tube through which cables pass to the control panel, slip rings or rotating electrical connectors to connect the control panel electrically to the enclosed space, or other connectors known in the art that enable the control panel to be electrically connected to the enclosed space while still rendering it able to rotate at least 180 degrees around its axis. The control panel may also be wirelessly connected to the enclosed space.

The axis of rotation of the control panel may be horizontal, vertical, diagonal, or directed in any other direction as long as it enables the control panel to rotate freely around that axis without interference from the cutout within the wall, and to substantially cover the cutout when either facing in or facing out.

In some embodiments of the invention, either the control panel or the cutout may have an insulating seal mounted around their perimeter, to make sure that the air within the enclosure does not intermix with outside air when the control panel is either facing in or facing out. The seal is preferably made of weatherstripping material, but may be any other sealing material.

The control panel may be rectangular, circular, or any other shape as long as the shape is symmetrical around the axis of rotation. In one embodiment of the present invention, the control panel is shaped like a portion of a sphere cut off by a plane, with the touchscreen or other controls located on the planar portion of the shape. This enables the control panel to fit more tightly in the cutout, making a more airtight connection.

DETAILED DESCRIPTION OF THE PREFERRED EMBODIMENT

Figure 1:
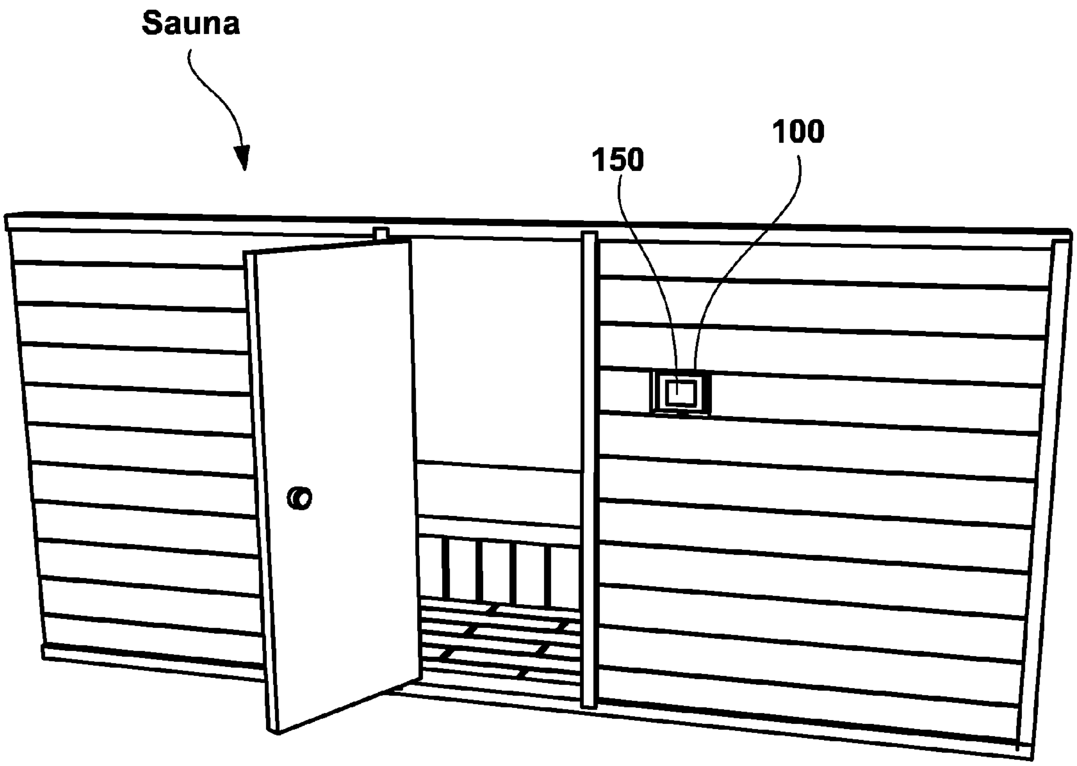
FIG. 1 shows a global view of the preferred embodiment of the control panel of the present invention.

FIG. 1 shows a global view of the preferred embodiment of the present invention. Control panel 100 is set within a cutout of the wall of the enclosed space, shown as a sauna in the Figure. Touchscreen 150 is shown on the control panel 100. In the position shown in the figure, touchscreen 150 is accessible from the outside of the sauna.

Figure 2:
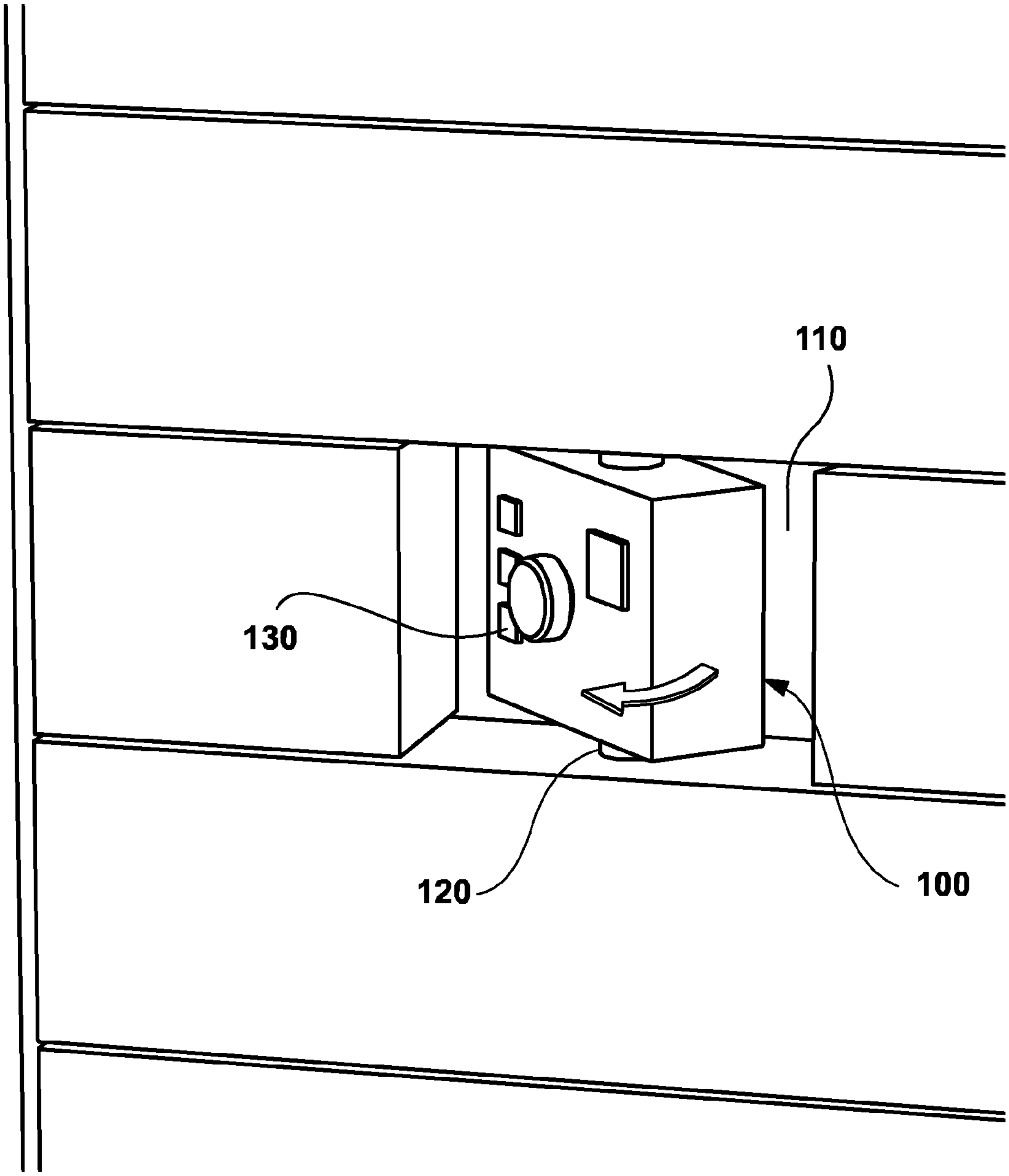
FIG. 2 shows a close up view of the preferred embodiment of the control panel of the present invention.

FIG. 2 shows a close-up view of an embodiment of the present invention, shown in mid-rotation. Control panel 100 is set within a cutout 110 within the wall of an enclosed space. In the alternate embodiment shown in FIG. 2, control panel 100 comprises various controllers 130 such as knobs and buttons and sliders. As discussed above, the control panel 100 can also comprise a touchscreen or any other means of controlling the desired variables. Rotating mount 120 is attached to the control panel 100 and the cutout 110, rendering the control panel 100 able to rotate around its axis within the cutout 110. The control panel may only rotate within the range of 180 degrees, or may rotate freely, depending on what type of rotating mount 120 is used; if slip rings or rotating electrical connectors are used, the control panel may rotate freely, whereas if a tube is used through which cables are passed, the control panel may only be able to rotate through a limited angle.

The control panel 100 may comprise controllers for any environmental parameters or any other parameters that the user may desire to control. In the preferred embodiment, the enclosed space is a sauna and the control panel 100 comprises temperature, humidity, and timer controls.

Figure 3:
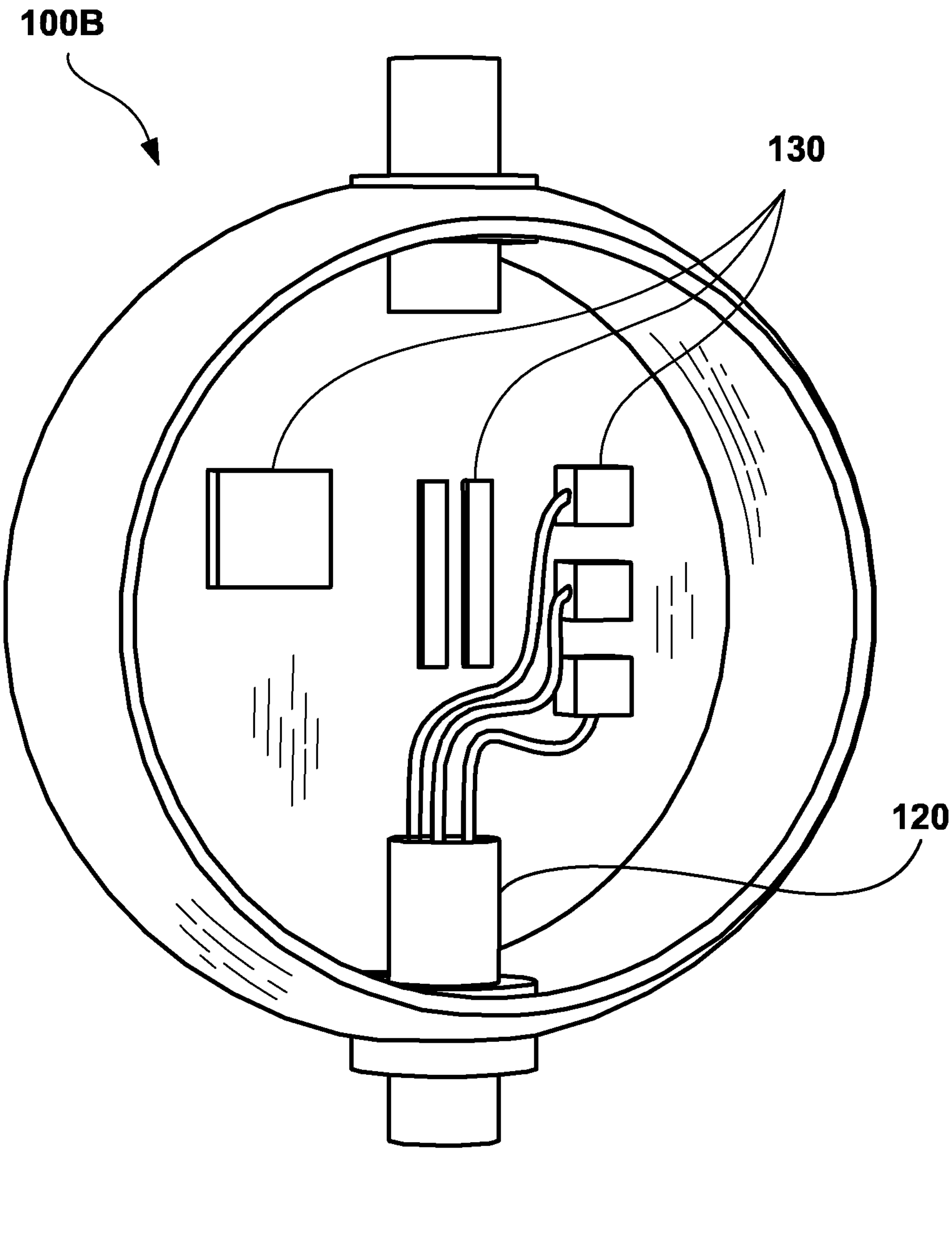
FIG. 3 shows an alternate embodiment of the control panel of the present invention, shown from the back with the back panel taken off.

FIG. 3 shows an alternate embodiment of the control panel of the present invention, shown from the back with the back panel taken off. Controllers 130 are connected by wires to the enclosed space, and the wires are passed through a tube in the rotating mount 120. In this embodiment, the control panel is shaped like a sphere cut off by two planes, with the controls located on the planar portion. This enables the control panel to be rotated without creating too much of an open space during the rotation for the air to pass into the enclosed space from the outside.

Figure 4:
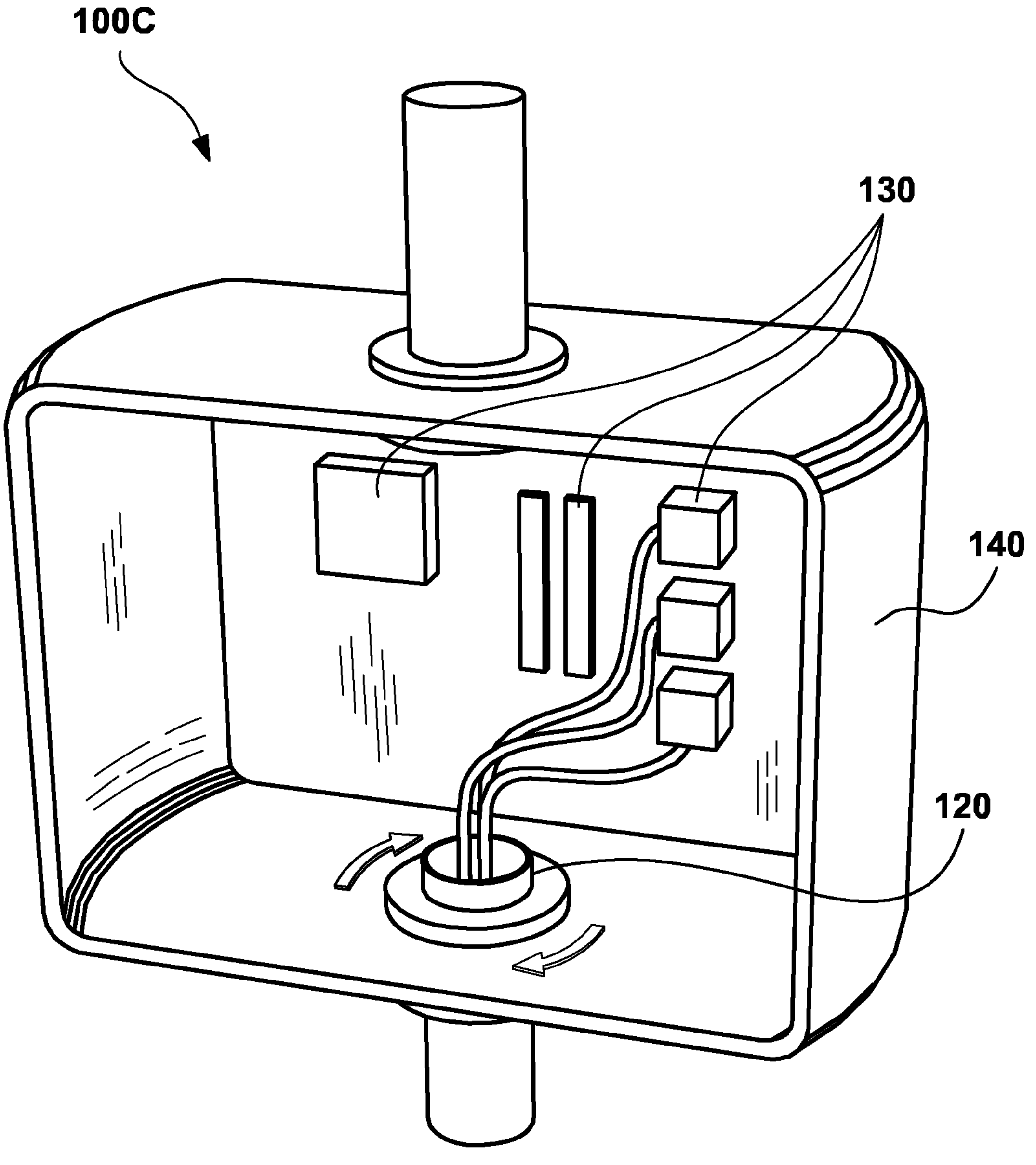
FIG. 4 shows another alternate embodiment of the control panel of the present invention, shown from the back with the back panel taken off.

FIG. 4 shows another alternate embodiment of the control panel of the present invention, also shown from the back with the back panel taken off. In this embodiment, the control panel is shaped like a cylinder cut off by two planes, with the controls located on the planar portion. This also enables the control panel to be rotated without creating too much of an open space during rotation, but allows the control panel to be roughly rectangular in shape and the cutout to be rectangular.

Figure 5:
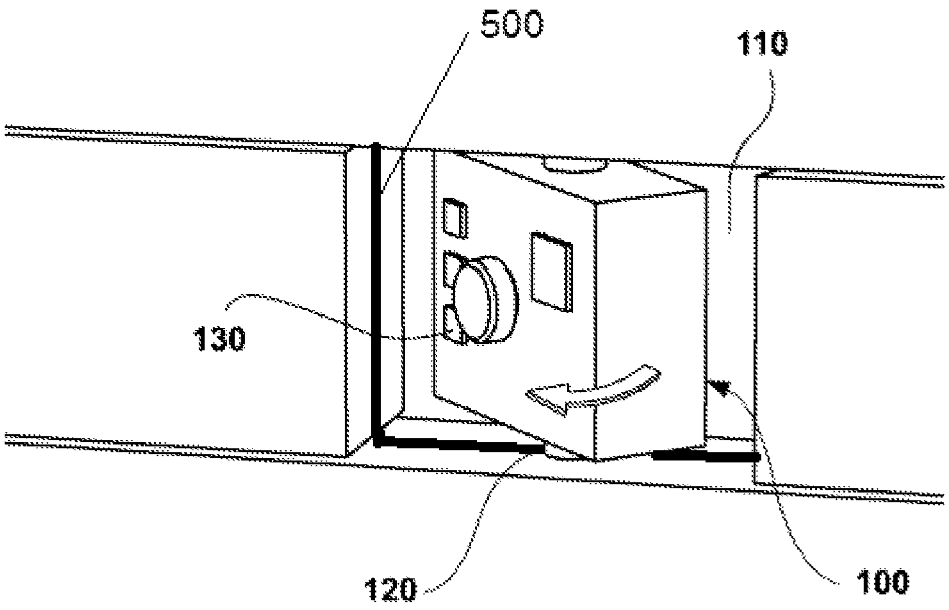
FIG. 5 shows an embodiment of the present invention showing the insulating seal around the opening.

Either the control panel or the cutout can have insulation attached to its perimeter, to prevent air from passing through the gap between the control panel and the walls of the cutout while the control panel is in place (i.e. facing either inward or outward). FIG. 5 shows the cutout with insulation 500 around the perimeter. The insulation can be made out of foam, foam rubber, or any other insulation material known in the art.

The invention claimed is:

1. An environmental control system for an enclosed space, comprising:

an opening within a wall of the enclosed space;

a control panel comprising a front side, a back side, a top, a bottom, an axis of rotation, and at least two sides, wherein the control panel is symmetrical around a plane equidistant from the front side and back side, wherein the at least two sides are curved in such a way that the radius of curvature is approximately equal to the distance between each one of the at least two sides and the axis of rotation, and connected to an external device by at least one electrical connector;

a rotating mount attached to the control panel at the top and at the bottom at the axis of rotation that enables the control panel to rotate at least 180 degrees within the opening without disconnecting the at least one electrical connector;

an insulating seal attached to the control panel in such a way as to contact the opening when the control panel is substantially coplanar with the wall while still allowing the control panel to rotate freely within the opening;

wherein the enclosed space is a sauna;

wherein the control panel is a touchscreen that enables the user to control the temperature in the sauna.

2. The environmental control system of claim 1, where the rotating mount comprises at least one hollow tube through which cables may be routed to the control panel, and does not comprise any holes for screws or pins perpendicular to the axis of rotation.

3. The environmental control system of claim 1, where the rotating mount comprises rotating electrical connectors.

4. The environmental control system of claim 1, where the front and back sides of the control panel are circular in shape.

5. The environmental control system of claim 1, where the front and back sides of the control panel are perfectly rectangular.

6. The environmental control system of claim 1, where the control panel is shaped like a cylinder cut off by two parallel planes that are parallel to the axis or the cylinder, wherein the two parallel planes are equidistant from the axis of rotation.

7. An environmental control system for an enclosed space, comprising:

an opening within a wall of the enclosed space;

a control panel comprising a front side, a back side, a top, a bottom, an axis of rotation, and at least two sides, wherein the control panel is symmetrical around a plane equidistant from the front side and back side, wherein the at least two sides are curved in such a way that the radius of curvature is approximately equal to the distance between each one of the at least two sides and the axis of rotation, connected to an external device by at least one electrical connector;

a rotating mount attached to the control panel at the top and at the bottom at the axis of rotation that enables the control panel to rotate at least 180 degrees within the opening without disconnecting the at least one electrical connector;

an insulating seal attached to the opening in such a way as to contact the control panel when the control panel is substantially coplanar with the wall while still allowing the control panel to rotate freely within the opening;

wherein the enclosed space is a sauna;

wherein the control panel is a touchscreen that enables the user to control the temperature in the sauna.

8. The environmental control system of claim 7, where the rotating mount comprises at least one hollow tube through which cables may be routed to the control panel, and does not comprise any holes for screws or pins perpendicular to the axis of rotation.

9. The environmental control system of claim 7, where the rotating mount comprises rotating electrical connectors.

10. The environmental control system of claim 7, where the front and back sides of the control panel are circular in shape.

11. The environmental control system of claim 7, where the front and back sides of the control panel are perfectly rectangular.

12. The environmental control system of claim 7, where the control panel is shaped like a cylinder cut off by two parallel planes that are parallel to the axis of the cylinder, wherein the two parallel planes are equidistant from the axis of rotation.

* * * * *